United States Patent [19]
Nicholson

[11] 3,951,480

[45] Apr. 20, 1976

[54] BEARING LUBRICATION SYSTEM FOR BOWED ROLLS

[75] Inventor: Charles B. Nicholson, Glens Falls, N.Y.

[73] Assignee: Albany International Corporation, Menands, N.Y.

[22] Filed: Nov. 7, 1973

[21] Appl. No.: 413,445

[52] U.S. Cl. .................................. 308/187; 308/20
[51] Int. Cl.² .......................................... F16C 33/76
[58] Field of Search ................... 308/18, 20, 92, 93, 308/101, 182, 187, 188, 190; 193/37; 198/192 R, 192 A

[56] References Cited
UNITED STATES PATENTS

| | | | |
|---|---|---|---|
| 1,628,220 | 5/1927 | Berg | 308/20 |
| 1,678,997 | 7/1928 | Mellin | 308/20 |
| 1,737,036 | 11/1929 | Wego | 308/20 |
| 3,666,049 | 5/1972 | Kern et al. | 308/187 |

*Primary Examiner*—Evon C. Blunk
*Assistant Examiner*—Robert Saifer
*Attorney, Agent, or Firm*—Kane, Dalsimer, Kane, Sullivan and Kurucz

[57] ABSTRACT

A bearing lubrication system for a bowed roll of the type having a series of spools disposed for rotation about a shaft is provided. Each of the spools is supported on the outer race of a bearing, the inner race of which is secured to the shaft. The system includes a lubricant reservoir and a plurality of lines extending from the reservoir along the shaft to fittings mounted on the side walls of the bearings.

4 Claims, 4 Drawing Figures

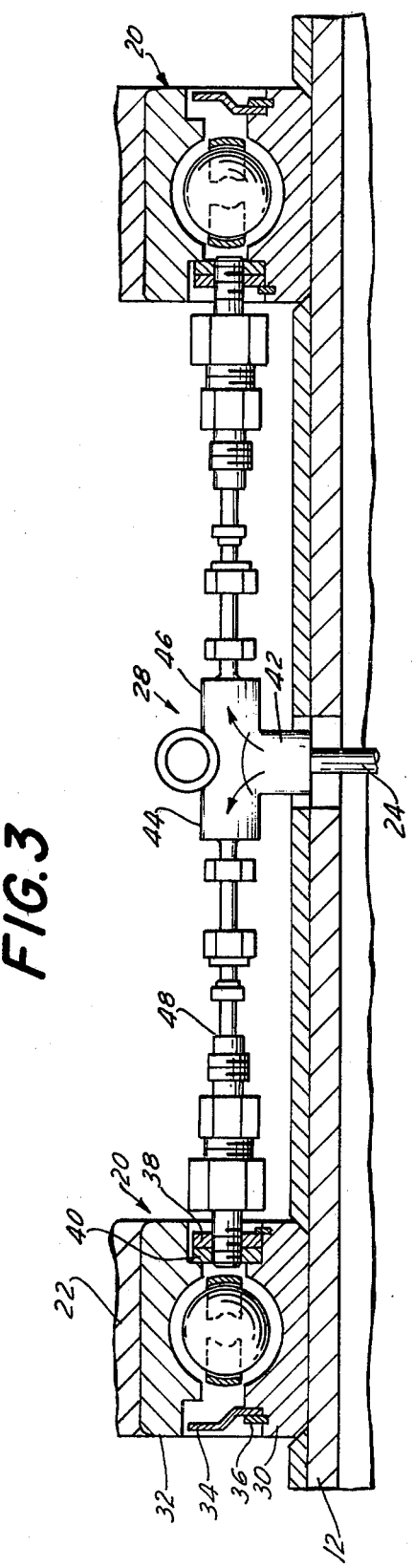
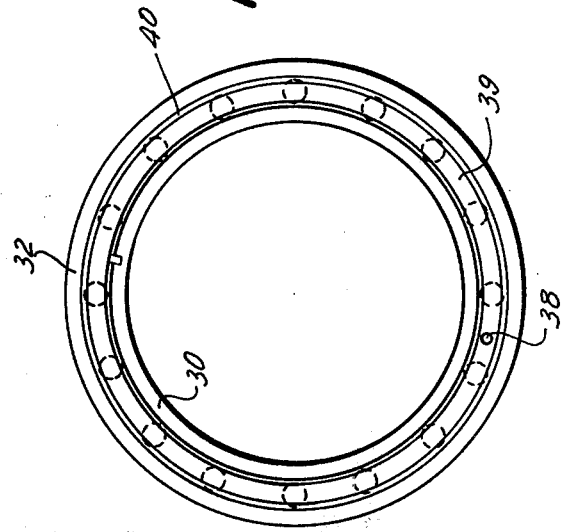

BEARING LUBRICATION SYSTEM FOR BOWED ROLLS

BACKGROUND OF THE INVENTION

The present invention relates to rolls and in particular to an improved lubrication system for bowed rolls.

Bowed rolls are extensively used in the paper and textile industries, as for example, in the conveyors with which these materials are handled and moved. The rolls comprise a curved sleeve supported by a series of spools which, in turn, are supported by bearings to rotate about a shaft. It is essential to the proper operation of the rolls that the bearings be constantly lubricated to insure proper operation.

In view of the above, it is the principal object of the present invention to provide a system which facilitates the lubrication of the bearings and which enables lubrication to occur without any slowing down or stoppage of the equipment.

SUMMARY OF THE INVENTION

The above and other beneficial objects and advantages are attained in a bowed roll of the type having an elongated shaft, a series of spools disposed along and about the shaft for rotation and a plurality of bearings for supporting the spools disposed along the shaft by providing an integral lubrication system. The system includes lines extending from a reservoir along the length of the shaft to the bearings. Each of the bearings has a side wall extending between each bearing inner and outer races and is provided with a lubrication fitting. The system may further include a pump to feed the lubricant from the reservoir to the bearings. Alternately, the lubricant may be manually fed such as by means of a hand-held grease gun.

BRIEF DESCRIPTION OF THE DRAWINGS

In the accompanying drawings:

FIG. 3 is an enlarged fragmentary side elevational sectional view depicting the lubrication of a pair of adjacent bearings in accordance with the present invention; and FIG. 4 is an elevational view of a bearing side wall depicting the lubrication fitting and seal.

DETAILED DESCRIPTION OF THE PREFERRED EMBODIMENT

Figure 1:
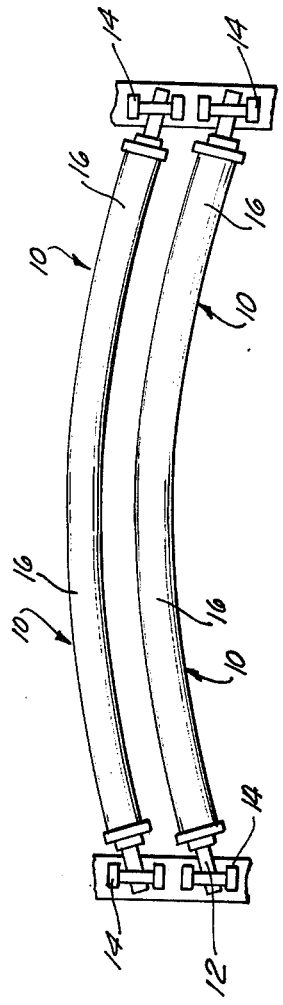
FIG. 1 is a top plan environmental view of bowed rolls in accordance with the present invention.

The present invention is illustrated in the accompanying drawings wherein similar components bear the same reference numerals throughout the several views. In FIG. 1 there is shown a plurality of bowed rolls 10 as are commonly used in the textile and paper industries. The rolls 10 each comprise a curved shaft 12 supported at its ends by journal supports 14. A sleeve 16 substantially coextensive with the shaft is disposed about the shaft and held in position at each end by an end cap 18 which, in turn, is supported for rotation with spool 22 which is keyed to the cap. A plurality of additional spools 23 is spaced along the shaft with each of the spools supported by a bearing 20. In operation, traveling textile or paper passes over the sleeve causing the sleeve and hence the spool to rotate about the shaft.

In this preferred embodiment, shaft 12 is hollow and disposed within the hollow shaft 12 is a plurality of lubrication lines 24. Each of the lines 24 comprises a hollow tube connected at one end to a reservoir 26 of lubricant and at the opposite end to a T-fitting 28. The reservoir 26 may be connected to a pump (not shown) to feed lubricant to the bearings 20. Alternately, the bearings could be manually fed as by loading the reservoir with a hand-held grease gun or the like.

Referring to FIG. 3, it can be seen that each bearing 20 includes an inner race 30 securely fitted about shaft 12 and an outer race 32 fitted to the inside of a spool (22 or 23). A conventional bearing side wall 34 held in position by a press wedge 36, snap ring or the like extends between the races on one side of the bearing. On the opposite side, the conventional side wall 39 is provided with a lubrication fitting 38 in the side wall. A sealing membrane 40 is provided interiorly of the fitting to prevent leakage of lubricant.

The T-fitting 28 is positioned between a pair of bearings 20, each provided with a lubricating fitting as described above. The fittings of each of the bearings of the pair face each other as shown. Each T-fitting 28 includes an inlet stem portion 42 extending radially toward the interior of the shaft where it receives one of the lubricating lines 24. The T-fitting 28 further includes a pair of opposed outlet stems 44 and 46 perpendicular to the inlet stem and directed toward the fittings of the pair of bearings on opposite sides of the T-fitting. A length of tubing 48 along with appropriate connectors and the like extends between each of stems 44 and 46 to the adjacent bearing fitting. As shown, the T-fitting 28 and lines 48 are positioned between the outer surface of shaft 12 and the inner surface of spool 22 in the fixed end position.

Figure 2:
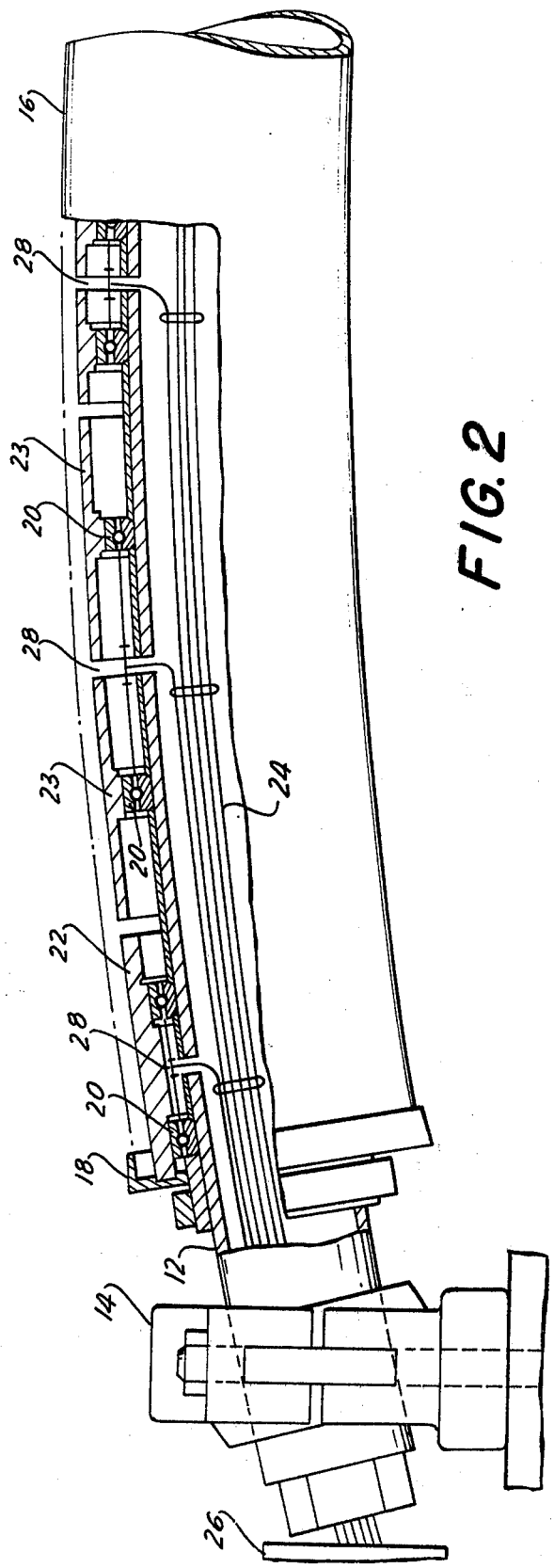
FIG. 2 is an enlarged fragmentary side elevational partial sectional view of a portion of one of the bowed rolls.

Referring to FIG. 2, it can be seen that a plurality of lines 24 is provided with one line and an associated T-fitting for each pair of bearings. Thus, as lubricant is pumped through lines 24, it can be fed through the T-fitting 28 to the two bearings adjacent that fitting. Pumping can be continuous even while the roll is in operation so that no shutdown or interruption of work is necessary in order to keep the roll properly lubricated. Thus, in accordance with the above, the aforementioned objectives are effectively attained.

The above preferred embodiment describes a bowed roll provided with a hollow shaft. It should be appreciated that the lubricating lines could also extend along the surface of a solid shaft. Also, while the preferred embodiment calls for lubricating the bearings in pairs, it should be understood that the bearings could be fed lubricant singularly, in pairs or in any multiples.

Having thus described the invention, what is claimed is:

1. In a bowed roll of the type having an elongated shaft; a plurality of spools disposed about said shaft for rotation; and a plurality of ball bearings disposed along said shaft, each of said bearings having an inner race in contact with said shaft, an outer race in contact with one of said spools and a pair of side walls extending between said races and cooperating with said races in defining a ball chamber said side walls being affixed to one of said races and slidable with respect to the other of said races; the improvement comprising a lubrication system for providing lubricant to the interior of said ball chamber including a lubricant reservoir, a lubrication fitting extending into said chamber through one of said sidewalls of each of said bearings and a lubricant line extending between said reservoir and said fitting along said shaft whereby lubricant may be injected directly into said chamber.

2. The bowed roll is accordance with claim 1 wherein said shaft is hollow and said lubricant line extends through said hollow shaft.

3. The bowed roll in accordance with claim 2 wherein said plurality of bearings is arranged in pairs along said shaft; a plurality of T-fittings, each disposed on said shaft between a pair of bearings, each of said fittings having an inlet stem extending radially toward said shaft interior and a pair of outlet stems extending perpendicular to the inlet stems opposite each other along said shaft toward a bearing side wall; line means extending between said outlet stems and bearing side walls; and a plurality of lubricant lines extending through said hollow shaft, each of said lubricant lines extending between said reservoir and one of said T-fittings.

4. The bowed roll in accordance with claim 1 further comprising a pair of bearings disposed along said shaft, each of said bearings having a lubricant fitting extending through one side wall; a T-fitting disposed on said shaft between said pair of bearings, said T-fitting having an inlet stem extending radially inwardly toward said shaft interior and a pair of outlet stems extending perpendicular to the inlet stem opposite each other along said shaft; and means extending between each of said T-fitting outlets and the fitting in the side walls of said pair of bearings.

* * * * *